United States Patent [19]
Hale

[11] Patent Number: 5,228,860
[45] Date of Patent: Jul. 20, 1993

[54] AIDS: THE EPIDEMIC BOARD GAME

[76] Inventor: Steven A. Hale, 1136 Gatlin Ave., Orlando, Fla. 32806

[21] Appl. No.: 876,030

[22] Filed: Apr. 30, 1992

[51] Int. Cl.$^5$ .......................... G09B 19/00; A63F 3/00
[52] U.S. Cl. ..................................... 434/129; 293/243
[58] Field of Search ...................... 273/243, 249, 256; 434/128, 129, 247

[56] References Cited

U.S. PATENT DOCUMENTS

| | | | |
|---|---|---|---|
| 4,136,879 | 1/1979 | Andrew et al. | 273/343 |
| 4,174,840 | 11/1979 | Curtiss | 273/243 X |
| 4,372,559 | 12/1980 | Summers | 273/243 |
| 4,904,808 | 3/1990 | Turner et al. | 273/240 |
| 4,966,371 | 10/1990 | Scherman | 273/243 |

FOREIGN PATENT DOCUMENTS

| | | | |
|---|---|---|---|
| 231281 | 8/1958 | Australia | 273/243 |
| 2215222 | 9/1989 | United Kingdom | 273/243 |

*Primary Examiner*—Gene Mancene
*Assistant Examiner*—L. Thomas

[57] ABSTRACT

An Acquired Immune Deficiency Syndrome (AIDS) educational device comprised primarily of a game board with a continuous path around its edge with some spaces designated "virus" spaces and others designated "Hospital", "Doctor's Office", etc. surrounding a central "graveyard" area for removed player tokens and space for game components and a Mortality Time-line depicting the yearly mortality from AIDS. Each player is assigned four tokens and by chance movement around the board, tokens become "infected" with the AIDS virus and eventually "expire". Cards of three types provide basic facts regarding the AIDS epidemic and terminal medical events and direct activities such as effects of the epidemic on a player generated list of Family members and Friends. Simulations of an Epidemiologist and Physician treatment are provided. The game can be played to a predetermined end point or time limit or until only one player has tokens on the playing path.

15 Claims, 4 Drawing Sheets

U.S. Patent
July 20, 1993     Sheet 2 of 4     5,228,860
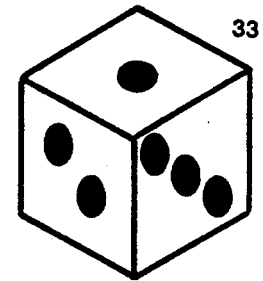
FIG.5
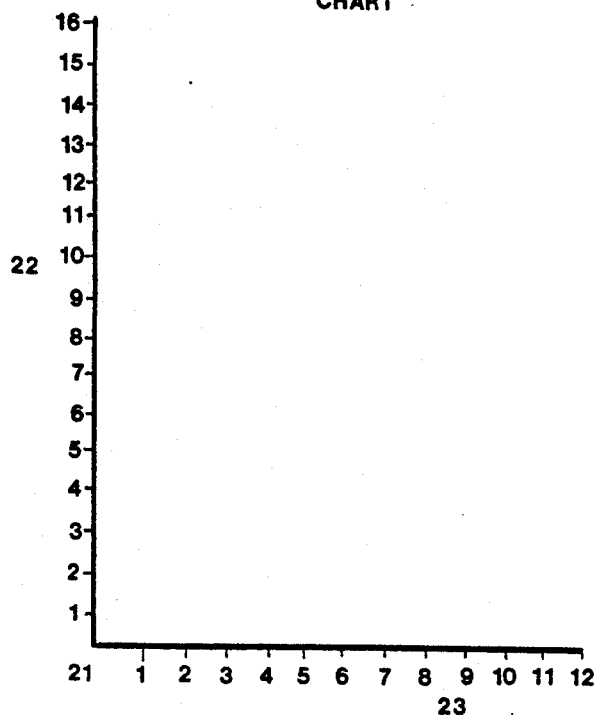
FIG.2    X = INFECTED   24
            ■ = DEATHS    25
FIG.3
FIG.4

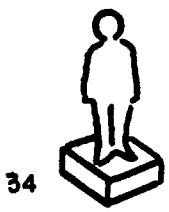
FIG. 6
34
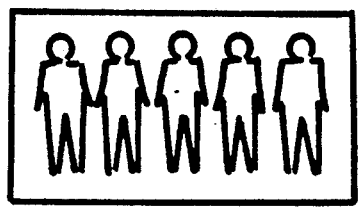
FIG. 7
35
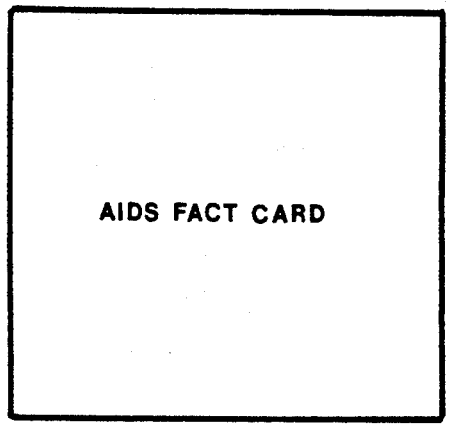
AIDS FACT CARD
36
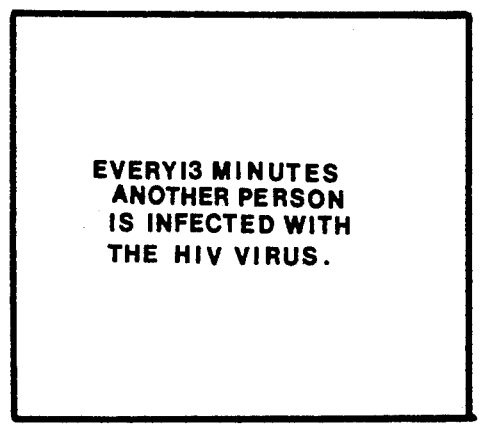
EVERY 13 MINUTES ANOTHER PERSON IS INFECTED WITH THE HIV VIRUS.
37
FIG. 8
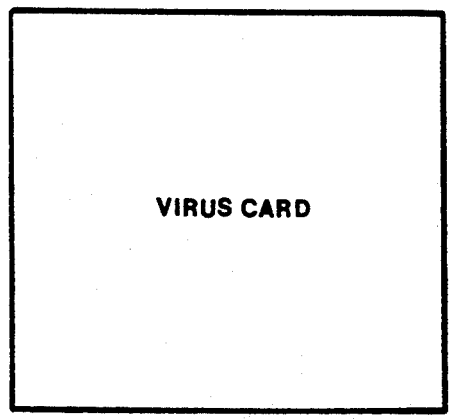
VIRUS CARD
38
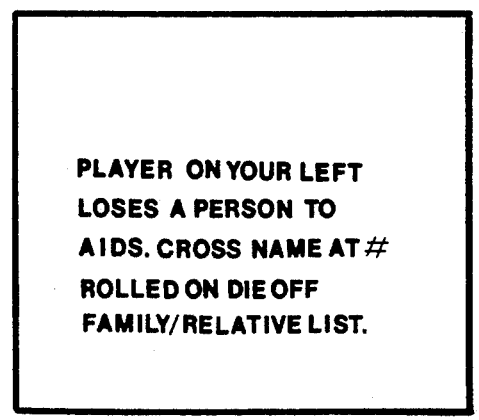
PLAYER ON YOUR LEFT LOSES A PERSON TO AIDS. CROSS NAME AT # ROLLED ON DIE OFF FAMILY/RELATIVE LIST.
39
FIG. 9

AIDS: THE EPIDEMIC BOARD GAME

BACKGROUND OF THE INVENTION

1. Field of the Invention

This invention relates to educational board games and more particularly to a board game regarding Acquired Immune Deficiency Syndrome, (AIDS).

2. Description of the Prior Art

At the present time there exist many sources of educational information related to the epidemic of Acquired Immune Deficiency Syndrome (AIDS) including videos, posters, televised public service announcements, books, and even letters from the Surgeon General. As long as no cure, vaccine or largely effective medical therapy is available, prevention will remain a very important factor in this as in any epidemic. In the case of AIDS, there is general agreement among authorities and public health officials alike that education is one of the most important means of slowing this epidemic.

Many of the above mentioned sources, although informative and in some cases containing meaningful messages have not brought about behavior changes applicable to the prevention of AIDS. Indeed, there remains concern about the risk behaviors of young people, especially teens—given reports of increasing teen pregnancy rates, and college age students—given studies showing a high prevalence of risk behaviors and little use of protective measures.

To my knowledge, an AIDS education tool in the form of a board game does not exist and might be devised such that it would give a lasting impression on persons playing the game, especially young people. It is known that many children and young persons have often played at various board games for recreation during their formative years. The intent of this invention is to draw on that familiarity and interest and by means of providing a unique mechanism for AIDS education as well as a more personal "experience" of the AIDS epidemic to accomplish superior behavior changes consistent with prevention.

Given that a major goal of any AIDS educational tool is behavior change, the present invention sustains the following objectives:

1. To provide an educational yet interesting board game in which the players experience personally the AIDS epidemic and the difficulty of survival as well as the devastation of the illness.

2. To provide an environment within the game to simulate the epidemic's effect on persons important to the players.

3. To provide a base of learning pertinent to the AIDS epidemic of a scope beneficial to all age groups.

4. To demonstrate the actual mortality of the epidemic and its manner of rising.

5. To provide simple simulations of other factors important to the AIDS epidemic overall—medical care by physicians, hospitalizations, antiviral treatments, and the function of an Epidemiologist.

SUMMARY OF THE INVENTION

The invention is a board game for the purpose of education regarding the Acquired Immune Deficiency Syndrome entitled "AIDS: The Epidemic Board Game". It is designed for up to four individual players but may be used by up to 16 as teams of four. By means of game apparatus, as player's tokens are moved around a sequential playing path they become "infected" with the AIDS virus, receive treatments in some instances and continue said movement until all of the player's tokens become infected and as their condition becomes terminal, are removed from play onto a central board area. The end of the game is either a predetermined number of complete traverses of the board, the removal of all player tokens or a specified number thereof or may simply be a specified time limit. At the end of such, an examination of the board may reveal a winner or merely survivors, the winner to be the player with the most tokens left on the playing path or the player whose tokens have a higher T-cell number. As each complete circling of the playing path will generally represent one year of time passage during the epidemic, both incidence of an illness and mortality of an illness may be tracked using further game apparatus, thus providing data to be used to demonstrate the role of an Epidemiologist. The game includes a mortality time line printed on the board.

Game apparatus includes a die for movement on the board. A set of cards designated AIDS Facts provide the base of factual knowledge. Terminal Event Cards provide information upon removal of player tokens and Virus Cards provide for effects of the epidemic on player pre-generated lists of their own family members, acquaintances and certain famous people. Game board spaces are printed with factors pertinent to the AIDS epidemic such as Hospital, Doctors Office etc. as well as spaces marked HIV for infection by the virus. Further simple simulations are provided by the game design to be discussed in further detail below.

BRIEF DESCRIPTION OF THE DRAWINGS

FIG. 2 is a top plan view of a chart for disease incidence and mortality.

FIG. 3 illustrates a sheet for recording names of persons generated by the players.

FIG. 4 illustrates a sheet for recording T-Cell counts of infected players.

FIG. 5 is a view in perspective of a die employed in the game.

FIG. 6 is a view in perspective of a player token.

FIG. 7 is a plan view of a strip for use on the mortality time line.

FIG. 8 represents the front and back side of a typical Aids Fact Card.

FIG. 9 represents the front and back side of a typical Virus Card.

DETAILED DESCRIPTION OF THE INVENTION

Figure 1:
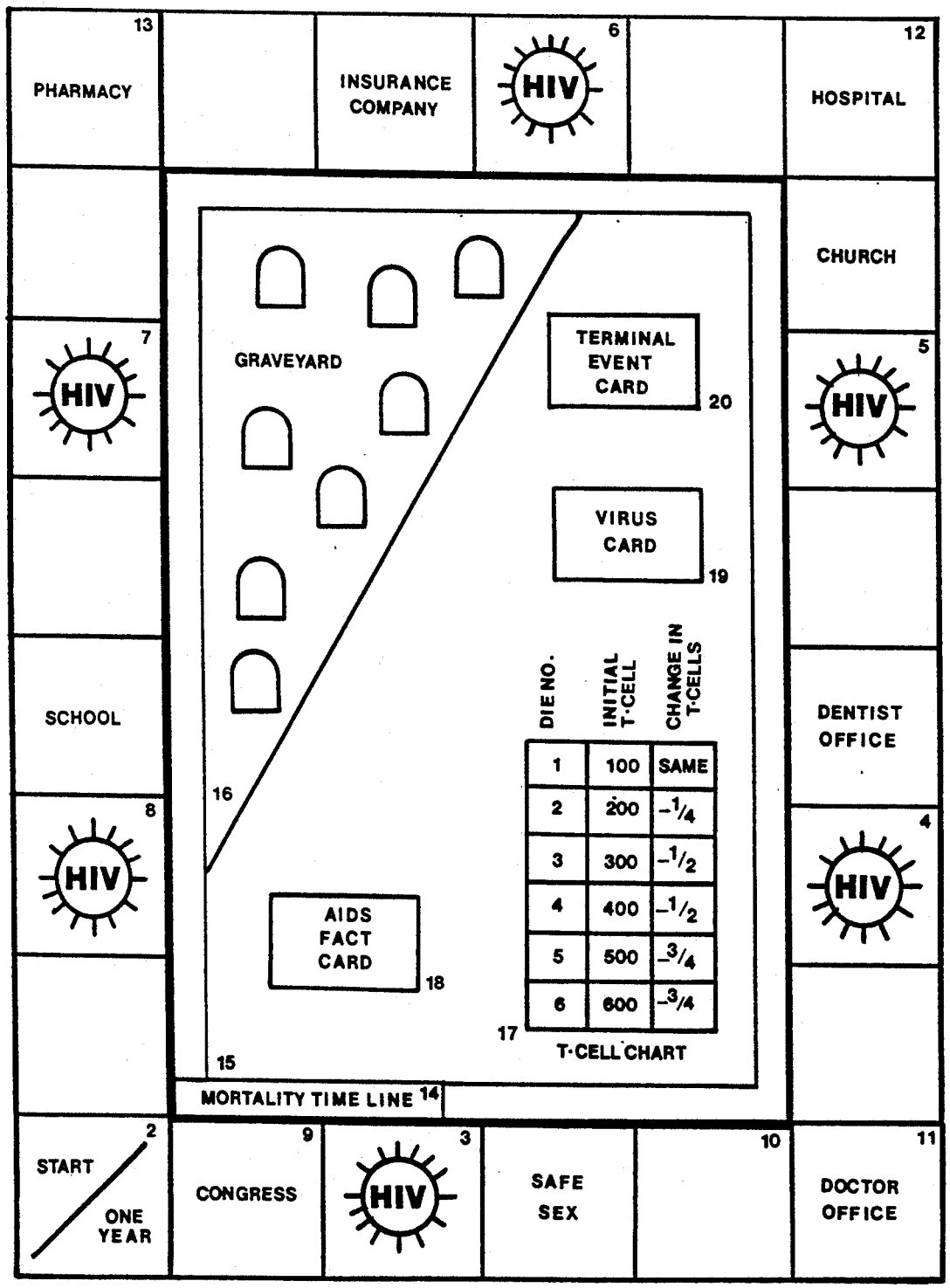
FIG. 1 is a top plan view of the foldable game board of the present invention.

Referring now to FIG. 1, there is shown a game board 1 with a designated Start/Year space 2 in the lower left corner. Proceeding around the perimeter of the board in a counter-clockwise direction are a number of designated HIV virus squares 3,4,5,6,7,8, respectively. Other designated squares, or topic spaces, for example, Congress 9, represent factors related to the Aids epidemic. Corner squares, medical treatment spaces designated doctor's office 11, hospital 12, and pharmacy 13 have specific functions in the play of the game. Positioned interiorly of the perimeter squares is a mortality time line 14 contiguous to the perimeter squares and surrounding a central area 15. Within the central area is a space designated Graveyard 16 for the placement of removed player tokens 34 and a space for a die result chart 17 by which T-cell numbers are determined for infected players. The central area also contains space for stacks of AIDS Fact cards 18, Virus Cards 19 and Terminal Event Cards 20.

In FIG. 2 there is illustrated the Epidemiologist's chart 21 for tracking the incidence and mortality of the infection among the players by plotting the sixteen tokens on the left axis 22 against the number of rounds 23 (or years) traveled on the board and by placing X's 24 in the round column to show new infections and by placing filled squares 25 to show deaths.

In FIG. 3 is shown a sheet 26 which is provided for listing Family/Relatives 27, Friends/Acquaintances 28 and Famous People 29, numbered accordingly so that by means of virus cards 19 and die, names on the list become casualties of the epidemic.

FIG. 4 shows a sheet 30 for a physician player or players to track the T-Cell counts (an important medical test result in HIV infection) of each player by writing a T-cell number 31 onto each line 32 on the sheet as players become infected and acquire a T-cell number from the chart 17 on the board by a roll of the die.

FIG. 5 shows a conventional die 33 which is used for movement and other actions in the game.

FIG. 6 shows a playing piece 34 in the form of a human figure with a flat base which allows for movement around the board. Sixteen playing pieces of this type are provided in four main colors with either stripes on some or color variations to establish four distinct groups of four playing pieces, each set for the purpose of allowing each of four players to bring to play a team representing himself and three other "buddy" tokens.

FIG. 7 is a representation of mortality time line strips 35 which are to be placed on the board on the mortality time line 14.

FIG. 8 shows the front 36 and back 37 of a typical AIDS Fact card.

FIG. 9 shows the front 38 and back 39 of a typical Virus card.

Figure 10:
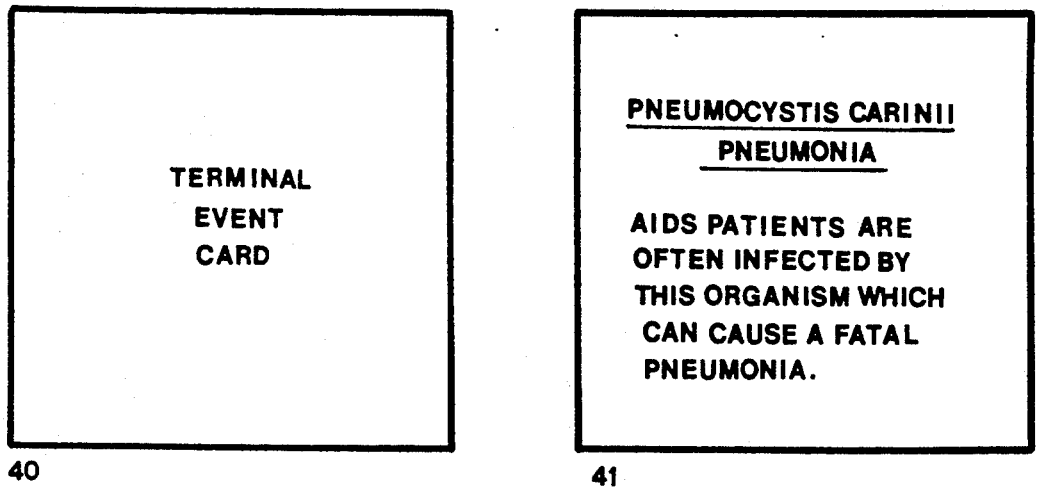
FIG. 10 represents the front and back side of a typical Terminal Event Card.

FIG. 10 shows the front 40 and back 41 of a typical Terminal Event card.

Figure 11:
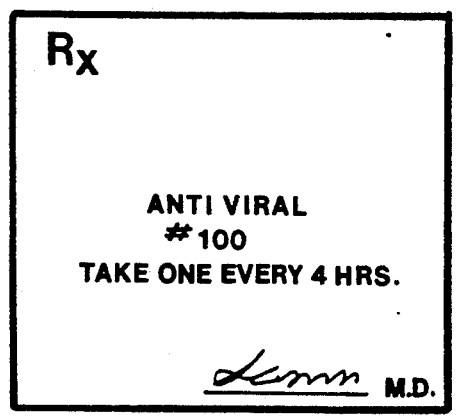
FIG. 11 represents the front side of a typical Prescription Card.

FIG. 11 shows a plan view of a medication prescription 42 for use in the game.

PLAY OF THE GAME

Prior to the start of the game, cards are shuffled and placed face up on the board as shown in FIG. 1 and each of four players will fill out a sheet 26 provided with the game that contains numbered spaces for six family members/relatives other than the player himself, eleven numbered spaces for friends/acquaintances of the player and two spaces labeled even/odd for the names of famous people. This sheet is utilized according to directions on virus cards that along with a die or dice roll will infect one of said names with the AIDS virus. One player is selected to play the role of the physician whose task is to track the T-cell numbers of the player's tokens as the game proceeds by use of the chart in FIG. 4. One player is selected to play the role of Epidemiologist and receives the chart in FIG. 2 to fill out as each round of the board is completed by the players which generally represents one year of the epidemic. Rounds of the board are determined by the occurrence of the first player to pass or land on the start/year 2 space after one circuit of the board. That player then becomes the "lead" player. A marker of any type may be held by that player to thus signify until such time as that player is passed on the board. The "lead" player may change on the board during the game if passed by another player. The first round completed, subsequent rounds are calculated as the "lead" player passes the start. As rounds are completed the Epidemiologist player fills out the chart FIG. 2, by counting the total "infected" tokens at the end of each round and placing that number of X's 24 on the chart above the particular round number. The same counting method can be used for the mortality record by counting the number of tokens removed from play and placing that number of blackened squares 25 above the round number.

The order of play may then be determined by a roll of the die, the player with the largest number on the die proceeding first.

The players then roll the die and move their tokens (4 each, representing the player himself or herself and three "buddies" or team) counterclockwise around the board together. As players move around the board, their tokens will land on certain designated spaces upon which certain actions will be taken. When Virus spaces 3–8 are landed upon, one of that player's tokens becomes infected with the virus and by a roll of the die and selection of the meaning of the result from the T-cell chart 17, initial T-cell (left) column, that token's T-cell count is determined and recorded on the T-cell record FIG. 4 by the "physician" player. Also at that time the top virus card 19 is chosen and read and the directions followed. Usually directions on the virus card will instruct an adjacent player to roll the die once or twice to select a name from his or her Family/Friend list FIG. 3 and to cross out that name as becoming a "victim" of AIDS. Players will land on virus squares many times by design of the game. Players must select a different token of their color the first four times that they land on a virus square so that tokens become infected in sequence and all get an initial T-Cell count from the T-cell chart on the game board. Then all subsequent landings on virus squares necessitate a die roll which may then lower the T-cell count of a selected token as can be seen on the change-in T-cell (right) column of the T-cell chart 17 of FIG. 1. The physician player will record all lowering of T-cells on the T-cell record, FIG. 4. For example a token with a T-cell count of 300 landing on a virus square and rolling a 3 on the die will result in that T-cell count dropping by one half to 150. For simplicity, T-cell numbers can be rounded to the nearest ten.

Topic squares landed on may for example be labeled Congress 9, or have certain other titles, and these factors are included to allow further discussion of the AIDS epidemic when the game is used in teaching sessions. Also when any labeled square is landed on, the player draws and reads aloud an AIDS fact card from the deck. There are unlabeled squares 10 on the playing path which require no action and which result in no penalty.

Medical Treatment squares have a specific extra use in the game. Treatment offered to AIDS patients is simulated by use of Doctor's office 11, Hospital 12 and Pharmacy 13 squares in the following manner. If a player with infected tokens lands on the Doctors Office 11 square, the physician player will give that player a "prescription" FIG. 11 for antiviral medicine. A player is allowed to only hold one prescription at a time. The prescription is held until such time that the pharmacy 13 square is landed on. This allows the player holding a prescription to receive treatment for one of his tokens. Treatment is performed as follows: the player would generally pick his token with the lowest T-cell number to receive treatment or he might want to pick the token representing himself. The player rolls the die one time and in this case adds the fraction noted on the right column of the T-cell chart 17 on the game board corresponding to the die roll or if the result of the roll is the number 1, than the treatment has no effect and his T-cells remain the same. Thus a player with a token with 200 T-cells rolling a 3 for treatment would add ½ of that previous amount to his T-cells resulting in this case in a total of 300 T-cells which would then be recorded on the T-cell record FIG. 4. of that token by the physician player. The prescription FIG. 11, is returned at that point to the physician player.

The Hospital space is utilized in the following manner. As players with tokens having T-cells below 100 (a serious condition when present in AIDS patients) land on virus spaces and said tokens are selected to be affected, the player must then place that particular selected token on the Hospital 12 space and roll the die. At this time with T-cells below 100, any die roll of 2-6 results in the token experiencing a terminal illness. A terminal illness card is then selected for that token, read, and then the token is removed from the hospital square to the central graveyard area 16. A die roll of 1 allows the T-cells to remain the same and the token would not experience a terminal illness and would be able to leave the hospital and return immediately to the square occupied prior to its placement on the hospital square.

Play continues until the aforementioned end of game condition is reached such as a specified time limit or a specified number of rounds.

The mortality time line 14 is used to display the real number of deaths each year from AIDS. As each round is completed, the appropriate time line strip is placed on the board, starting to the right of the time line label 14. Each mortality time line strip is labeled with a year, for example 1991, and is printed with a number of small human figures 35, each figure representing one-thousand persons with AIDS who have died, in this case twenty-two figures. Included will be representative strips for 1985 to the present and further strips for use as new statistics for future years are calculated.

It is to be understood that the foregoing is one representation of possible arrangements for the play of this game. Further simplification may be made for example by omitting the Epidemiologist and physician roles. Other arrangements may be made without departing from the scope and purpose of the invention.

What is claimed is:

1. A method of playing a game comprising:
   (A) providing a game which comprises
      (1) a game board which includes
         (i) a playing path divided into spaces, said spaces comprising a plurality of Topic spaces, Medical Treatment spaces, unlabeled spaces, HIV virus spaces and
         (ii) a central area,
      (2) a plurality of sets of tokens, each set representing a team,
      (3) a dice for controlling the number of squares which can be advanced during a turn,
      (4) a plurality of AIDS Fact cards having facts and statistics printed thereon, associated with a basic knowledge of the subject,
      (5) a plurality of Terminal Event cards having disease entities printed thereon,
      (6) a plurality of Virus cards having special directions printed thereon which must be followed,
      (7) a T-Cell chart which relates a value for an initial T-Cell number and a factor for the change in T-Cells to a dice roll;
   (B) rolling said dice to determine the starting player;
   (C) having said starting player roll the die to determine the number of spaces to advance in a counterclockwise direction from the Start space and having said starting player advance his tokens the number of spaces equivalent to the number appearing on said die;
   (D) having starting player and subsequent players in turn landing on blank spaces take no action as the turn is finished;
   (E) having starting player and subsequent players in turn landing on labeled Topic spaces draw and read aloud an AIDS Fact card;
   (F) having said starting player's tokens and subsequent player's tokens, upon landing on HIV Virus spaces, become "infected" with the virus and by roll of the die, be given an initial T-Cell number from the T-Cell chart;
   (G) requiring players whose tokens land on HIV Virus spaces to draw a Virus card and to follow instructions on said Virus card;
   (H) requiring players whose tokens have been infected with the HIV Virus and been given an initial T-Cell number, upon each subsequent landing on HIV Virus spaces, roll the die and select the appropriate fraction from the Change-in-T-Cell column of the T-Cell chart and to apply that fraction to lower the T-Cell number of that selected token;
   (I) requiring a player to remove a token from the playing path, when said token has less than a predetermined number of T-Cells;
   (J) requiring a player to read a Terminal Event card upon removal of any of his tokens from the playing path.

2. The method of claim 1, wherein the game further includes means for designating the passage of a year of time as the completion of a round of the board by the lead player, wherein said lead player is the first to pass the Year space until such time as said lead player may be passed.

3. The method of claim 1, wherein the central area of the game board further includes a mortality time line printed thereon.

4. The method of claim 3, further including mortality time line markers which are placed on the mortality time line, upon completion of each round of the board, said mortality time line markers representing the actual yearly mortality from AIDS.

5. The method of claim 1, wherein the game further includes prescription cards and wherein the plurality of medical treatment spaces includes a Doctor's Office space, whereupon landing on that space, a player is awarded a prescription card for Antiviral treatment.

6. The method of claim 5, wherein a player holding a prescription card for Antiviral treatment and who subsequently lands upon the medical treatment space marked Pharmacy, is allowed to apply treatment to an infected token by adding the fraction indicated by roll of the die on the change in T-Cell chart to increase that token's T-Cell number.

7. The method of claim 1, wherein the game further includes an Incidence and Mortality game pad for recording epidemic results.

8. The method of claim 7, wherein the appropriate Incidence and Mortality pad is marked with the number of infected and removed player tokens as each round of the board is completed.

9. The method of claim 1, wherein the game further includes a lined game pad marked with the heading Family/Relatives, Friends/Acquaintances, and Famous People on which a player generates a list of persons.

10. The method of claim 9, wherein names are crossed off the Family/Relatives, Friend/Acquaintances, and Famous People list of each player according to directions on Virus Cards.

11. The method of claim 1, wherein the game further includes a game pad marked Physician's T-Cell Record for recording the T-Cell number of each player token.

12. The method of claim 11, wherein the current T-Cell number of each player's token is marked on the Physician's T-Cell Record, as said player's token is assigned an initial T-Cell number from the T-Cell Chart and as subsequent changes in T-Cell number for that token are applied.

13. The method of claim 1, wherein the game board central area further includes an area for removed player tokens.

14. The method of claim 13, wherein the area for removed player tokens is marked Graveyard.

15. The method of claim 1, wherein the game winner is that player with the most tokens remaining on the playing path and having the highest T-Cell number, and meeting one of the following end of the game conditions:
   a. only one player has tokens on the playing path;
   b. completion of a predetermined number of rounds of the board;
   c. a predetermined time limit is reached.

* * * * *